US009913135B2

(12) United States Patent
Perold et al.

(10) Patent No.: US 9,913,135 B2
(45) Date of Patent: Mar. 6, 2018

(54) SYSTEM AND METHOD FOR ELECTRONIC KEY PROVISIONING AND ACCESS MANAGEMENT IN CONNECTION WITH MOBILE DEVICES

(71) Applicant: Element, Inc., New York, NY (US)

(72) Inventors: Adam Perold, New York, NY (US); Daniel Abrams, New York, NY (US)

(73) Assignee: ELEMENT, INC., New York, NY (US)

( * ) Notice: Subject to any disclaimer, the term of this patent is extended or adjusted under 35 U.S.C. 154(b) by 0 days.

(21) Appl. No.: 14/711,664

(22) Filed: May 13, 2015

(65) Prior Publication Data

US 2015/0334562 A1 Nov. 19, 2015

Related U.S. Application Data

(60) Provisional application No. 61/992,783, filed on May 13, 2014.

(51) Int. Cl.
*H04L 29/06* (2006.01)
*H04W 12/04* (2009.01)
*H04W 12/06* (2009.01)
*H04W 12/08* (2009.01)
(Continued)

(52) U.S. Cl.
CPC ............ *H04W 12/04* (2013.01); *H04L 9/088* (2013.01); *H04L 9/3226* (2013.01); *H04L 9/3231* (2013.01); *H04L 63/061* (2013.01); *H04L 63/068* (2013.01); *H04L 63/0861* (2013.01); *H04L 63/107* (2013.01);
(Continued)

(58) Field of Classification Search
CPC ....... G06F 21/32; G06F 21/34; H04L 63/107; H04L 63/0861; H04L 63/12; H04L 63/068; H04W 12/04; H04W 12/06
USPC .......................................................... 713/171
See application file for complete search history.

(56) References Cited

U.S. PATENT DOCUMENTS

| 3,733,861 A | 5/1973 | Lester |
| 4,371,951 A | 2/1983 | Kort et al. |
| 5,067,164 A | 9/1991 | Denker et al. |

(Continued)

FOREIGN PATENT DOCUMENTS

| EP | 0049039 B1 | 7/1984 |
| EP | 2192526 A2 | 2/2010 |

(Continued)

OTHER PUBLICATIONS

Boult, Terrance E., Walter J. Scheirer, and Robert Woodworth. "Revocable fingerprint biotokens: Accuracy and security analysis." 2007 IEEE Conference on Computer Vision and Pattern Recognition. IEEE, 2007.*

(Continued)

*Primary Examiner* — Syed Zaidi
(74) *Attorney, Agent, or Firm* — Wilson Sonsini Goodrich & Rosati

(57) ABSTRACT

Novel systems and methods are disclosed for electronic key provisioning and access management in connection with mobile devices. The electronic keys can be time-denominated and event-denominated, thereby increasing the security and ease of use of access management for physical or virtual resources. The access management is granted in a protocol based on biometric features, contextual data, electronic keys, or a combination thereof.

23 Claims, 6 Drawing Sheets

(51) Int. Cl.
*H04L 9/08* (2006.01)
*H04L 9/32* (2006.01)

(52) U.S. Cl.
CPC .......... *H04W 12/06* (2013.01); *H04W 12/08* (2013.01); *H04L 63/168* (2013.01); *H04L 2463/082* (2013.01)

(56) References Cited

U.S. PATENT DOCUMENTS

| | | | |
|---|---|---|---|
| 5,058,179 | A | 10/1991 | Denker et al. |
| 5,450,523 | A | 9/1995 | Zhao |
| 5,774,059 | A | 6/1998 | Henry et al. |
| 5,867,802 | A | 2/1999 | Borza |
| 6,274,745 | B1 | 8/2001 | Inanaga et al. |
| 6,633,090 | B2 | 10/2003 | Harter et al. |
| 6,663,090 | B2 | 10/2003 | Harter et al. |
| 6,923,370 | B2 | 8/2005 | Gotfried et al. |
| 6,992,562 | B2 | 1/2006 | Fuks et al. |
| 7,218,761 | B2 | 5/2007 | McClurg et al. |
| 7,660,442 | B2 | 2/2010 | Sweeney et al. |
| 8,026,840 | B2 | 9/2011 | Dwelly et al. |
| 8,064,645 | B1 | 11/2011 | Sezille |
| 8,160,307 | B2 | 4/2012 | Polcha et al. |
| 8,194,938 | B2 | 6/2012 | Wechsler et al. |
| 8,638,939 | B1 | 1/2014 | Casey et al. |
| 8,965,287 | B2 | 2/2015 | Lam |
| 9,002,586 | B2 | 4/2015 | Feit |
| 9,003,196 | B2 | 4/2015 | Hoyos et al. |
| 9,111,402 | B1 | 8/2015 | Krishnan et al. |
| 2004/0017934 | A1* | 1/2004 | Kocher .............. G06K 9/00906 382/125 |
| 2006/0120568 | A1 | 6/2006 | McConville et al. |
| 2006/0294393 | A1 | 12/2006 | McCall |
| 2008/0002860 | A1 | 1/2008 | Super et al. |
| 2008/0091952 | A1* | 4/2008 | Sumner ................. H04L 63/064 713/185 |
| 2008/0263681 | A1* | 10/2008 | Dooms ................... G06F 21/10 726/33 |
| 2008/0284726 | A1 | 11/2008 | Boillot |
| 2008/0296364 | A1 | 12/2008 | Pappas et al. |
| 2009/0001160 | A1* | 1/2009 | Davis .................. H04W 76/028 235/380 |
| 2009/0175506 | A1 | 7/2009 | Polcha et al. |
| 2009/0249478 | A1* | 10/2009 | Rosener .................. G06F 21/31 726/19 |
| 2009/0297032 | A1 | 12/2009 | Loui et al. |
| 2010/0030698 | A1 | 2/2010 | Goodin |
| 2010/0042940 | A1 | 2/2010 | Monday et al. |
| 2010/0046830 | A1 | 2/2010 | Wang et al. |
| 2010/0127827 | A1 | 5/2010 | Watanabe |
| 2010/0128936 | A1 | 5/2010 | Baughman |
| 2010/0148923 | A1 | 6/2010 | Takizawa |
| 2010/0191551 | A1 | 7/2010 | Drance et al. |
| 2010/0246902 | A1 | 9/2010 | Rowe et al. |
| 2011/0119734 | A1 | 5/2011 | Crawford et al. |
| 2011/0229045 | A1 | 9/2011 | Yu |
| 2011/0270712 | A1* | 11/2011 | Wood ..................... G01C 21/20 705/27.1 |
| 2012/0046862 | A1 | 2/2012 | Griffin et al. |
| 2012/0128936 | A1 | 5/2012 | Imajima et al. |
| 2012/0137137 | A1 | 5/2012 | Brickell et al. |
| 2012/0162385 | A1 | 6/2012 | Park et al. |
| 2013/0099892 | A1 | 4/2013 | Tucker et al. |
| 2013/0222835 | A1 | 8/2013 | Iwamoto et al. |
| 2013/0227651 | A1 | 8/2013 | Schultz et al. |
| 2013/0268418 | A1 | 10/2013 | Sardi et al. |
| 2013/0290154 | A1 | 10/2013 | Cherry et al. |
| 2013/0294642 | A1 | 11/2013 | Wang et al. |
| 2013/0311866 | A1* | 11/2013 | Herold .................. G06Q 10/107 715/230 |
| 2014/0013252 | A1 | 1/2014 | Ehrler et al. |
| 2014/0037134 | A1 | 2/2014 | Tong et al. |
| 2014/0068740 | A1 | 3/2014 | Lecun et al. |
| 2014/0072185 | A1* | 3/2014 | Dunlap .............. G06K 9/00288 382/118 |
| 2014/0366113 | A1 | 12/2014 | Lecun et al. |
| 2015/0010145 | A1 | 1/2015 | Iwashita et al. |
| 2015/0039892 | A1 | 2/2015 | Fujita et al. |
| 2015/0348214 | A1 | 12/2015 | Jain |

FOREIGN PATENT DOCUMENTS

| | | |
|---|---|---|
| JP | 2002032343 A | 1/2002 |
| JP | 2002259345 A | 9/2002 |
| JP | 2006259923 A | 9/2006 |
| JP | 2008242631 A | 10/2008 |
| JP | 2010128822 A | 6/2010 |
| JP | 2010146502 A | 7/2010 |
| WO | WO-2009013526 A1 | 1/2009 |
| WO | WO-2012020591 A1 | 2/2012 |
| WO | WO-2014039732 A2 | 3/2014 |
| WO | WO-2015175670 A1 | 11/2015 |

OTHER PUBLICATIONS

Boureau, et al., A theoretical analysis of feature pooling in visual recognition. Proceedings of the 27th International Conference on Machine Learning. 2010; 111-118.

Cortes et al., Support-vector networks. Machine Learning. 1995; 20:273-297.

Dalal et al., Histograms of oriented gradients for human detection. Proceedings of the 2005 IEEE Computer Society Conference on Computer Vision and Pattern Recognition. 2005; 1:886-893.

Lecun et al., Convolutional networks and applications in vision. Proceedings of IEEE International Symposium on Circuits and Systems. 2010; 253-256.

Lecun et al., Gradient-based learning applied to document recognition. Proceedings of the IEEE. Nov. 1998; 86(11):2278-2324.

Lowe, D. Distinctive image features from scale-invariant keypoints. International Journal of Computer Vision. 2004; 60(2):91-110.

PCT/US2013/058343 International search report dated Mar. 13, 2014.

PCT/US2013/058343 IPRP dated Mar. 19, 2015.

PCT/US2015/030586 International Search Report and Written Opinion dated Aug. 20, 2015.

PCT/US2015/034077 International Search Report and Written Opinion dated Sep. 30, 2015.

Sermanet et al., Pedestrian detection with unsupervised multi-stage feature learning. Proceedings of the IEEE Conference on Computer Vision and Pattern Recognition. Jun. 2013; 3626-3633.

U.S. Appl. No. 14/019,512 Office Action dated Nov. 6, 2014.

U.S. Appl. No. 14/449,730 Final Office Action dated Apr. 30, 2015.

U.S. Appl. No. 14/449,730 Office Action dated Nov. 18, 2014.

Viola et al., Rapid object detection using a boosted cascade of simple features. Proceedings of the 2001 IEEE Computer Society Conference on Computer Vision and Pattern Recognition. 2001; 1:I-511-I-518.

ARIPO Patent Application No. AP/P/2015/008348 Examination Report dated Apr. 27, 2016.

Mexican Patent Application No. MX/a/2015/002841 Office Action dated Jun. 15, 2016.

U.S. Appl. No. 14/449,730 Office Action dated Mar. 31, 2016.

Han et al., Palmprint recognition based on directional features and graph matching. Advances in Biometrics: ICB 2007, 4642:1164-1173, 2007.

PCT/US2015/030586 International Preliminary Report on Patentability dated Nov. 24, 2016.

Singapore Patent Application No. 11201501691V Second Written Opinion dated Aug. 7, 2016.

U.S. Appl. No. 14/730,166 Office Action dated Sep. 29, 2016.

PCT/US2015/034077 International Preliminary Report on Patentability dated Dec. 15, 2016.

Chinese Patent Application No. 2013800556919 First Office Action dated Jul. 3, 2017.

Eurasian Patent Application No. 201590485 Office Action dated Sep. 19, 2017 (English language translation not received to date).

(56) References Cited

OTHER PUBLICATIONS

European Patent Application No. 13834699.4 Communication dated Aug. 17, 2017.
Japanese Patent Application No. 2015-531210 second Office Action dated Sep. 11, 2017 (English language translation not received to date).
Japanese Patent Publication No. JP 10-177650 dated Jun. 30, 1998.
U.S. Appl. No. 14/449,730 Office Action dated May 30, 2017.
U.S. Appl. No. 14/730,166 Office Action dated Feb. 28, 2017.
U.S. Appl. No. 14/730,166 Office Action dated Jul. 13, 2017.
U.S. Appl. No. 14/449,730 Office Action dated Oct. 18, 2017.
Israel Patent Application No. 237556 Office Action dated Oct. 30, 2017 (No translation provided by the foreign associate).

* cited by examiner

SYSTEM AND METHOD FOR ELECTRONIC KEY PROVISIONING AND ACCESS MANAGEMENT IN CONNECTION WITH MOBILE DEVICES

CROSS-REFERENCE TO RELATED APPLICATIONS

This application claims the benefit of the U.S. Provisional Patent Application No. 61/992,783, filed 13 May 2014, the entire disclosure of which is hereby incorporated herein by reference.

BACKGROUND OF THE INVENTION

Access control is important in managing facilities and properties. With the increasing prevalence of Internet-connected devices, also known as the "Internet of things," and rapid growth in acceptance and participation in shared resources across industries, also known as the "sharing economy," many assets can be connected and utilized as shared resources. As a result, access control authentication and management have to be redesigned in order to enhance security and ease of use.

SUMMARY OF THE INVENTION

Mobile devices, such as smartphones, tablets, and notebooks, have become widely adopted and used by many people on a daily basis. As these devices have become more powerful and as developers create more applications and services that run on them, they become even more ubiquitous and central to everyday activity. These devices not only provide a powerful computing platform in their own right, but also connectivity to a nearly limitless set of services, applications, and data available on remote platforms.

Leveraging the power of these devices enables replacing essential items such as wallets and physical keys. For example, applications and services have been developed that allow a person to use their phone to pay for services at a store, such as a supermarket or gas station. In another example, a person uses their phone to pay for dinner at a restaurant.

One important issue that arises in the context of mobile devices and their widespread use in connection with nearly unlimited functionality and their need to interact with many different resources is the need to control access to each of these resources so that only those individuals or devices that should be authorized to access the applicable resources are actually able to do so. In the typical case, resource access is controlled through the input of text/numerical strings, such as user IDs and passwords. For example, a smartphone user may be required to enter a passcode before he or she is permitted to access any functionality on the device. In addition, each local application or resource may also require the user to enter one or more text/numerical strings prior to using the application or resource's functionality. In this case, the correct strings may be stored in the memory of the device or located remotely from the device.

For a typical smartphone user, for example, there are a number of drawbacks with the foregoing techniques for authentication and identification. For one, the need to remember user IDs and passwords for so many different applications, services, and other resources, each having their own requirements for how those IDs and passwords must be constructed, can be quite daunting, and users often forget their IDs and passwords for resources that they do not access on a frequent basis. Another disadvantage is that there are security concerns with using textual/numeric strings to control access to resources. There are, for example, powerful software programs that can be used to hack these strings to gain unauthorized access to resources.

One technology presented herein is to eliminate or reduce the drawbacks discussed above by using biometric technology to control access to resources via mobile devices. While this method has, in some cases, eliminated some drawbacks discussed above, there remain a number of disadvantages. For example, some contact based solutions call for a user to place his or her finger on the device sensor which has the ability to capture the user's fingerprint, which is then matched against local or remotely located fingerprint data to determine if there is a match sufficient to allow the user or the device to access one or more resources. In this case, a fingerprint can be lifted from the device sensor by a hacker and be used to gain unauthorized access to one or more resources at a later time. These solutions also typically suffer from the drawback that the time to perform the processing necessary to determine if the fingerprint is a match can be unacceptable in the context of a busy user trying to gain access to many different resources on the device during the course of a typical day. Therefore, this application presents additional technology to address these issues.

The technology described herein also addresses health issues associated with contact-based methods involving transmittal of germs, viruses, or other biological hazards, particularly in the case of shared devices between users. An individual's fingertips, and an individual's hands more generally, are often one of the primary media for transferring germs, viruses, or other biological hazards between people. In the case of individual devices being shared amongst multiple people, contact-based methods of authentication and identification in which a user types an identifying string with his or her fingertips, or authenticates or identifies himself or herself through contact-based biometric methods, such as contact-based fingerprint or contact-based palm print recognition, among others, create risk of transferring said biological hazards via the shared contact medium.

In the context of physical resources and services, the technology described herein also solves an issue that arises in access management. Currently, if a person would like to grant a third party access to his or her home, he or she may either elect to be at home when the third party arrives or give said third party a physical key. In certain cases, it may not be practical for a busy individual to be at home to grant a third party access. Certain individuals will choose to give service providers physical keys for access. There are security issues with giving a third party a key for even a short duration. The key can be copied or leant to additional parties. In both cases, the property owner may not necessarily be made aware of the security breach and bear great future risk of property loss or other damages.

In the case of a multi-unit building, such as a hotel, individuals come and leave at a multitude of times. As is generally the case today, in order to check into a hotel, an individual needs to check in at the front desk to receive a key to be able to enter the room. The key may be a digital keycard with a time code stamp and may not allow access after the time duration. In most cases, the hotel will already have the information they need from the guest and the interaction will solely serve to hand over the key. To support this, the hotel needs to staff the reception desk with employees, computing devices, and key provisioning hardware. One of the key teachings of the present invention is a system and method for hotels to be able to provision keys to end users electronically via their smartphones, with high security against the wrong users gaining unauthorized access, thereby eliminating the need for a physical key or interaction with front desk personnel.

The ability to remotely provision keys to certain users for physical access to certain facilities has become increasingly important because of the wide distribution globally of mobile computing devices enabling electronic keys to be efficiently distributed and managed broadly via software services, the increased popularity and adoption of computer-enabled devices in the homes and commercial locations in which many people conduct their daily activities, also known as "the internet of things" in modern parlance, as well as a growing number of services focused on enabling people to share or rent their existing properties and/or rights, often referred to in modern parlance as "the sharing economy."

A subject matter of the technology disclosed herein is to provide a system and method for provisioning access keys to a variety of physical and virtual resources. The system and method uses secure authentication, and specifically programmable electronic key provisioning and authentication or identification via biometrics to permit or deny users access to shared resources such as real-property, automobiles, or other physical or virtual resources. In a preferred embodiment, biometric authentication or identification is performed using an image or a set of images of an individual's palm through a process comprising the following key steps: (1) detecting the palm area using local classifiers, (2) extracting features from the region(s) of interest, and (3) computing the matching score against the user model(s) stored in a database, which can be augmented dynamically through a learning process. The learning process may involve a multi-layered, hierarchical form, also known as a deep architecture. The methodology of such a process, also known as "deep learning," plays a critical role in enabling the successful biometric matching of users at high performance across the diversity of general-purpose, camera-equipped devices in popular use globally. Deep learning generally refers to a family of algorithms in machine learning structured around developing more powerful and robust representations of information by processing many layers of non-linear computations at increasing levels of abstraction, and combining these outputs in order to form an executable that can recognize new data more accurately.

In one aspect, the disclosed technology allows users of camera-equipped devices to identify or authenticate themselves as a condition of obtaining access to one or more resources by taking one or a series of photos of their palm with a camera-equipped device. Note that camera-equipped devices may include smartphones; however, the devices are to be understood as including all devices with a camera capability, including mobile devices such as smartwatches, stationary devices such as desktop computers, or devices embedded in other equipment such as an automobile, vehicle, appliances, etc. The system then analyzes the palm print image or images and either verifies that the palm print signature matches the user's model in a database (user authentication) or finds the matching user model among many models in a database (user identification).

In another aspect, a computer-implemented system for electronic key provisioning and access management comprising: (a) a digital processing device comprising a memory module and an operating system configured to perform executable instructions; (b) a computer program including instructions processed by the digital processing device to execute an application comprising: (1) a software module configured to obtain one or more biometric features of an end user; (2) a software module configured to receive geo-location data, other contextual data, or a combination thereof; (3) a software module configured to create or receive an electronic key; and (4) a software module configured to grant an access to a physical or virtual resource based on the one or more biometric features, or on the electronic key, or on geo-location data, or on a time, or on one or more event, or on resource locations, or on other contextual data, or on a combination thereof. In some embodiments, the obtaining the one or more biometric features is completed in a contact-free manner. In some embodiments, one or more biometric features comprise features derived from one or more biometric modalities of a fingerprint, a palm print, an iris, a retina, a face, a human cardiac rhythm, and a human voice. In some embodiments, granting the access comprises verifying an identity of the end user based on the one or more biometric features and subsequently unlocking the physical or virtual resource. In some embodiments, granting the access comprises a simultaneous or near-simultaneous execution of events, the events being selected from the following group: (a) verification or identification of the one or more biometric features of the end user; (b) measurement of proximity of a geo-location of the end user to a location of the physical or virtual resource; (c) reading of a device ID of the digital processing device; (d) entering of a unique passcode by the end user on the digital processing device; and (e) verification or identification of a signature derived from one or more additional biometric modalities of the end user. In some embodiments, contextual data about the location of the physical or virtual resource changes over time, requiring time-based or event-based updates containing this location data to be sent from the physical or virtual resource to the digital processing devices of the end users, such that any geo-location dependent permissions associated with the location data of the physical or virtual resource remain valid. In some embodiments, granting the access comprises requiring permission from one or more additional users. In some embodiments, granting the access comprises an asynchronous execution of events, the events being selected from the following group: (a) verification or identification of the one or more biometric features of the end user; (b) measurement of proximity of a geo-location of the end user to a location of the physical or virtual resource; (c) reading of a device ID of the digital processing device; (d) entering of a unique passcode by the end user on the digital processing device; and (e) verification or identification of a signature derived from one or more additional biometric modalities of the end user. In some embodiments, contextual data about the location of the physical or virtual resource changes over time, requiring time-based or event-based updates containing this location data to be sent from the physical or virtual resource to the digital processing devices of the end users, such that any geo-location dependent permissions associated with the location data of the physical or virtual resource remain valid. In some embodiments, granting the access comprises requiring permission from one or more additional users. In some embodiments, the asynchronous execution of the events is permitted based on a monitoring of the digital processing device between time periods of the events. In some embodiments, the asynchronous execution of the events is permitted based on user-inputted or contextual data. In some embodiments, granting the access is executed in a contact-free process, the process comprising verification or identification of the end user via an optical or audio signature of the end user's one or more biometric modalities. In some embodiments, the optical signature of the end user's biometric modality is derived from a feature set of a human palm, performed by capturing an image or a set of images of the end user's palm through following steps: (a) detecting a palm area using local classifiers; (b) extracting features from one or more regions of interest; and (c) computing a matching score against one or more user models stored in a database, the database is augmented dynamically through a learning process. In some embodiments, the learning process comprises a deep learning-based architecture. In some embodiments, the physical resource comprises one or more of: a house, an apartment, a hotel room, an office, a building, a facility, a storage unit, an automobile, a bicycle, a motorcycle, an airplane, a helicopter, a remotely operated robot such as a drone, or a maritime vessel. In some embodiments, the physical resource comprises a subspace of one or more of: a house, an apartment, a hotel room, an office, a building, a facility, a storage unit, an automobile, a bicycle, a motorcycle, an airplane, a helicopter, a remotely operated robot such as a drone, or a maritime vessel. In some embodiments, the virtual resource comprises one or more of: financial information, a digital services account, a digital goods account, an individual file, a plurality of files, a user interface, a security system, an operating system, an application, a plurality of applications, an email, or a telecommunications system. In some embodiments, the electronic key is revocable. In some embodiments, the electronic key is time-denominated, event-denominated, or a combination thereof. In some embodiments, the electronic key is synchronized with a database in a computing device. In some embodiments, the computing device is controlled by a manager of the physical or virtual resource, the manager allowing a user of the computing device to perform one or more of the following: (a) viewing data associated with the electronic key; (b) communicating directly with the end user; (c) creating or destroying the electronic key; and (d) sending or receiving the electronic key. In some embodiments, the data associated with the electronic key data is updated regularly or in real-time. In some embodiments, the application further comprises a software module configured to receive, store, transmit, or create the electronic key to the physical or virtual resource.

In another aspect, disclosed herein are non-transitory computer-readable storage media encoded with a computer program including instructions executable by a digital signal processor to create an application for electronic key provisioning and access management, the application comprising: (a) a software module configured to obtain one or more biometric features of an end user; (b) a software module configured to acquire geo-location data, other contextual data, or a combination thereof; (c) a software module configured to create or receive an electronic key; and (d) a software module configured to grant an access to a physical or virtual resource based on the one or more biometric features, or on the electronic key, or on geo-location data, or on a time, or on one or more event, or on resource locations, or on other contextual data, or on a combination thereof. In some embodiments, the obtaining the one or more biometric features is completed in a contact-free manner. In some embodiments, one or more biometric features comprise features derived from one or more biometric modalities of a fingerprint, a palm print, an iris, a retina, a face, a human cardiac rhythm, and a human voice. In some embodiments, granting the access comprises verifying an identity of the end user based on the one or more biometric features and subsequently unlocking the physical or virtual resource. In some embodiments, granting the access comprises a simultaneous or near-simultaneous execution of events, the events being selected from the following group: (a) verification or identification of the one or more biometric features of the end user; (b) measurement of proximity of a geo-location of the end user to a location of the physical or virtual resource; (c) reading of a device ID of the digital processing device; (d) entering of a unique passcode by the end user on the digital processing device; and (e) verification or identification of a signature derived from one or more additional biometric modalities of the end user. In some embodiments, contextual data about the location of the physical or virtual resource changes over time, requiring time-based or event-based updates containing this location data to be sent from the physical or virtual resource to the digital processing devices of the end users, such that any geo-location dependent permissions associated with the location data of the physical or virtual resource remain valid. In some embodiments, granting the access comprises requiring permission from one or more additional users. In some embodiments, granting the access comprises an asynchronous execution of events, the events being selected from the following group: (a) verification or identification of the one or more biometric features of the end user; (b) measurement of proximity of a geo-location of the end user to a location of the physical or virtual resource; (c) reading of a device ID of the digital processing device; (d) entering of a unique passcode by the end user on the digital processing device; and (e) verification or identification of a signature derived from one or more additional biometric modalities of the end user. In some embodiments, contextual data about the location of the physical or virtual resource changes over time, requiring time-based or event-based updates containing this location data to be sent from the physical or virtual resource to the digital processing devices of the end users, such that any geo-location dependent permissions associated with the location data of the physical or virtual resource remain valid. In some embodiments, granting the access comprises requiring permission from one or more additional users. In some embodiments, the asynchronous execution of the events is permitted based on a monitoring of the digital processing device between time periods of the events. In some embodiments, the asynchronous execution of the events is permitted based on user-inputted or contextual data. In some embodiments, granting the access is executed in a contact-free process, the process comprising verification or identification of the end user via an optical or audio signature of the end user's one or more biometric modalities. In some embodiments, the optical signature of the end user's biometric modality is derived from a feature set of a human palm, performed by capturing an image or a set of images of the end user's palm through following steps: (a) detecting a palm area using local classifiers; (b) extracting features from one or more regions of interest; and (c) computing a matching score against one or more user models stored in a database, the database is augmented dynamically through a learning process. In some embodiments, the learning process comprises a deep learning-based architecture. In some embodiments, the physical resource comprises one or more of: a house, an apartment, a hotel room, an office, a building, a facility, a storage unit, an automobile, a bicycle, a motorcycle, an airplane, a helicopter, a remotely operated robot such as a drone, or a maritime vessel. In some embodiments, the physical resource comprises a subspace of one or more of: a house, an apartment, a hotel room, an office, a building, a facility, a storage unit, an automobile, a bicycle, a motorcycle, an airplane, a helicopter, a remotely operated robot such as a drone, or a maritime vessel. In some embodiments, the virtual resource comprises one or more of: financial information, a digital services account, a digital goods account, an individual file, a plurality of files, a user interface, a security system, an operating system, an application, a plurality of applications, an email, or a telecommunications system. In some embodiments, the electronic key is revocable. In some embodiments, the electronic key is time-denominated, event-denominated, or a combination thereof. In some embodiments, the electronic key is synchronized with a database in a computing device. In some embodiments, the computing device is controlled by a manager of the physical or virtual resource, the manager allowing a user of the computing device to perform one or more of the following: (a) viewing data associated with the electronic key; (b) communicating directly with the end user; (c) creating or destroying the electronic key; and (d) sending or receiving the electronic key. In some embodiments, the data associated with the electronic key data is updated regularly or in real-time. In some embodiments, the application further comprises a software module configured to receive, store, transmit, or create the electronic key to the physical or virtual resource.

In another aspect, disclosed herein is a method implemented by a computer for electronic key provisioning and access management, the method comprising: (a) obtaining, by the computer, one or more biometric features of an end user; (b) receiving, by the computer, geo-location data, other contextual data, or a combination thereof; (c) creating or receiving, by the computer, an electronic key; and (d) granting, by the computer, an access to a physical or virtual resource based on the one or more biometric features, or on the electronic key, or on geo-location data, or on a time, or on one or more event, or on resource locations, or on other contextual data, or on a combination thereof. In some embodiments, obtaining the one or more biometric features is completed in a contact-free manner. In some embodiments, the one or more biometric features comprise features derived from one or more biometric modalities of a fingerprint, a palm print, an iris, a retina, a face, a human cardiac rhythm, and a human voice. In some embodiments, granting the access comprises verifying an identity of the end user based on the one or more biometric features and subsequently unlocking the physical or virtual resource. In some embodiments, granting the access comprises a simultaneous or near-simultaneous execution of events, the events being selected from the following group: (a) verification or identification of the one or more biometric features of the end user; (b) measurement of proximity of a geo-location of the end user to a location of the physical or virtual resource; (c) reading of a device ID of the digital processing device; (d) entering of a unique passcode by the end user on the computer; and (e) verification or identification of a signature derived from one or more additional biometric modalities of the end user. In some embodiments, contextual data about the location of the physical or virtual resource changes over time, requiring time-based or event-based updates containing this location data to be sent from the physical or virtual resource to the digital processing devices of the end users, such that any geo-location dependent permissions associated with the location data of the physical or virtual resource remain valid. In some embodiments, granting the access comprises requiring permission from one or more additional users. In some embodiments, granting the access comprises an asynchronous execution of events, the events being selected from the following group: (a) verification or identification of the one or more biometric features of the end user; (b) measurement of proximity of a geo-location of the end user to a location of the physical or virtual resource; (c) reading of a device ID of the computer; (d) entering of a unique passcode by the end user on the computer; and (e) verification or identification of a signature derived from one or more additional biometric modalities of the end user. In some embodiments, contextual data about the location of the physical or virtual resource changes over time, requiring time-based or event-based updates containing this location data to be sent from the physical or virtual resource to the digital processing devices of the end users, such that any geo-location dependent permissions associated with the location data of the physical or virtual resource remain valid. In some embodiments, granting the access comprises requiring permission from one or more additional users. In some embodiments, the asynchronous execution of the events is permitted based on a monitoring of the computer between time periods of the events. The asynchronous execution of the events is permitted based on user-inputted or contextual data. In some embodiments, granting the access is executed in a contact-free process, the process comprising verification or identification of the end user via an optical or audio signature of the end user's one or more biometric modalities. In some embodiments, the optical signature of the end user's biometric modality is derived from a feature set of a human palm, performed by capturing an image or a set of images of the end user's palm through following steps: (a) detecting a palm area using local classifiers; (b) extracting features from one or more regions of interest; and (c) computing a matching score against one or more user models stored in a database, the database is augmented dynamically through a learning process. In some embodiments, the learning process comprises a deep learning-based architecture. In some embodiments, the physical resource comprises one or more of: a house, an apartment, a hotel room, an office, a building, a facility, a storage unit, an automobile, a bicycle, a motorcycle, an airplane, a helicopter, a remotely operated robot such as a drone, or a maritime vessel. In some embodiments, the physical resource comprises a subspace of one or more of: a house, an apartment, a hotel room, an office, a building, a facility, a storage unit, an automobile, a bicycle, a motorcycle, an airplane, a helicopter, a remotely operated robot such as a drone, or a maritime vessel. In some embodiments, the virtual resource comprises one or more of: financial information, a digital services account, a digital goods account, an individual file, a plurality of files, a user interface, a security system, an operating system, an application, a plurality of applications, an email, or a telecommunications system. In some embodiments, the electronic key is revocable. In some embodiments, the electronic key is time-denominated, event-denominated, or a combination thereof. In some embodiments, the electronic key is synchronized with a database in a computing device. In some embodiments, the computing device is controlled by a manager of the physical or virtual resource, the manager allowing a user of the computing device to perform one or more of the following: (a) viewing data associated with the electronic key; (b) communicating directly with the end user; (c) creating or destroying the electronic key; and (d) sending or receiving the electronic key. In some embodiments, the data associated with the electronic key data is updated regularly or in real-time. In some embodiments, the method further comprises receiving, storing, transmitting, or creating, by the computer, the electronic key to the physical or virtual resource.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1A:
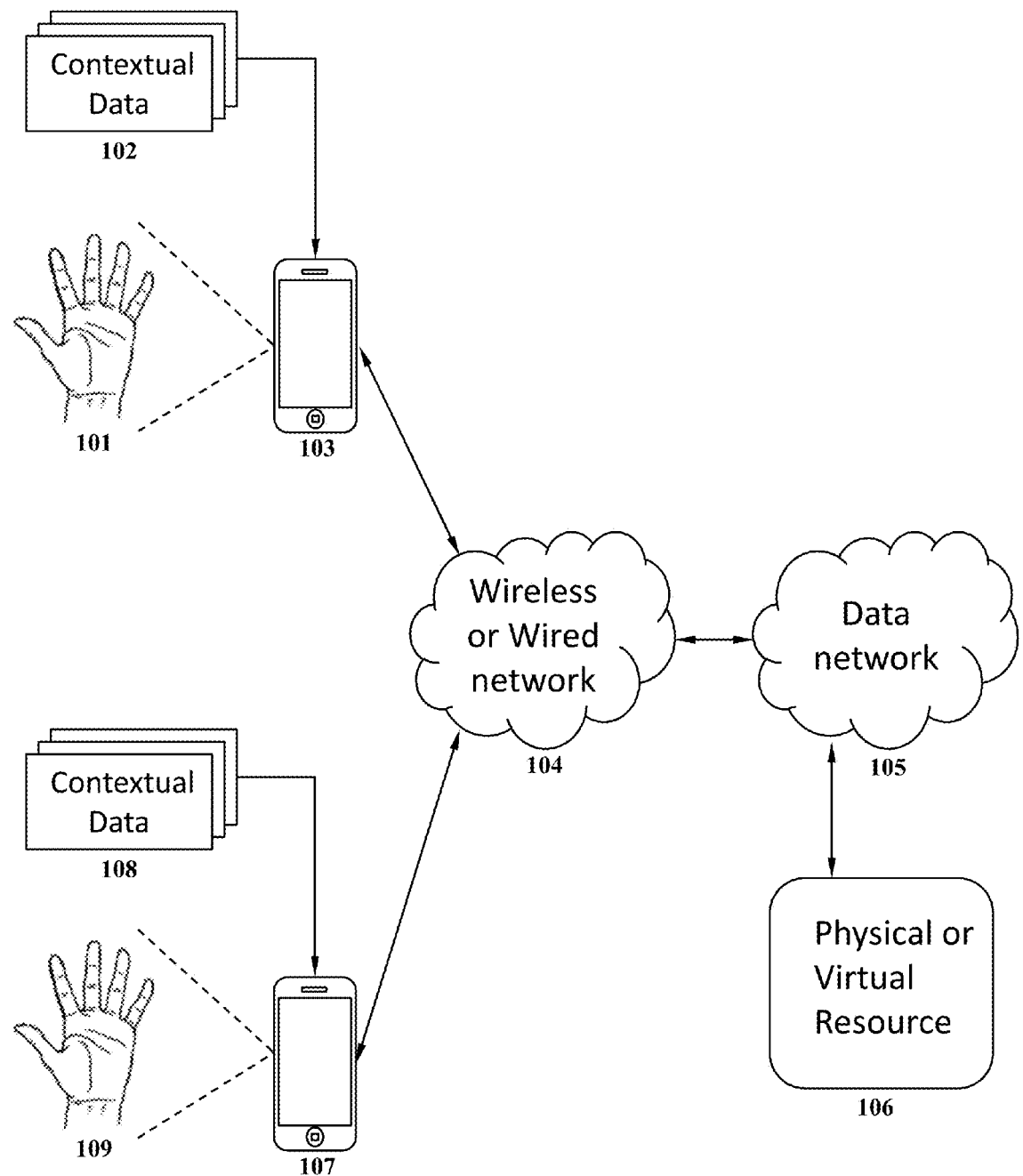
FIG. 1A shows an example system of electronic key provisioning and access management; in this case, one or more end users use the system.

Reference will now be made in detail to various exemplary embodiments of the invention. It is to be understood that the following discussion of exemplary embodiments is not intended as a limitation on the invention, as broadly disclosed herein. Rather, the following discussion is provided to give the reader a more detailed understanding of certain aspects and features of the invention.

Before the embodiments of the present invention are described in detail, it is to be understood that the terminology used herein is for the purpose of describing particular embodiments only, and is not intended to be limiting. Unless defined otherwise, all technical terms used herein have the same meaning as commonly understood by one of ordinary skill in the art to which the term belongs. Although any methods and materials similar or equivalent to those described herein can be used in the practice of the present invention, the preferred methods and materials are now described. All publications mentioned herein are incorporated herein by reference to disclose and describe the methods and/or materials in connection with which the publications are cited. The present disclosure is controlling to the extent it conflicts with any incorporated publication.

As used herein and in the appended claims, the singular forms "a", "an", and "the" include plural referents unless the context clearly dictates otherwise. Thus, for example, reference to "a palm" includes a single palm or both palms of an individual and reference to "an image" includes reference to one or more images. Furthermore, the use of terms that can be described using equivalent terms includes the use of those equivalent terms. Thus, for example, the use of the term "camera" is to be understood to include any device capable of obtaining an image of an object. As another example, the term "smartphone" includes all mobile devices with a digital signal processor.

The deficiencies of the prior art include inability to provide a system and method for generating programmable electronic keys that can be revocable, time-denominated and/or event-denominated for mobile device-enabled access to physical or virtual resources, such as a residential house or apartment, an office facility, an automobile, a space for storage of physical goods, any sub-space or sub-spaces therein, a virtual data room, a financial account, and many other types of physical and virtual resources, including but not limited to using biometric authentication, such as via the image or set of images of the palm print of an end user, as well as potentially including other direct or contextual information about the user.

It is thus a primary object of the technology disclosed herein to provide a system and method for generating programmable electronic keys that can be revocable, time-denominated and/or event-denominated for mobile device-enabled access to physical or virtual resources, such as a residential house or apartment, an office facility, an automobile, a space for storage of physical goods, any sub-space or sub-spaces therein, a virtual data room, a financial account, and many other types of physical and virtual resources.

In various embodiments, the technology described herein allows users of camera-equipped devices to identify or authenticate themselves as a condition of obtaining access to one or more resources by taking one or a series of photos of their palm with a camera-equipped device. Note that camera-equipped devices may include smartphones; however, the devices are to be understood as including all devices with a camera capability, including mobile devices such as smartwatches, stationary devices such as desktop computers, or devices embedded in other equipment such as an automobile, vehicle, appliances, etc. The system then analyzes the palm print image or images and either verifies that the palm print signature matches the user's model in a database (user authentication) or finds the matching user model among many models in a database (user identification).

In various embodiments, the technology described herein comprises a computer-implemented system for electronic key provisioning and access management comprising: (a) a digital processing device comprising a memory module and an operating system configured to perform executable instructions; (b) a computer program including instructions processed by the digital processing device to execute an application comprising: (1) a software module configured to obtain one or more biometric features of an end user; (2) a software module configured to acquire geo-location data, other contextual data, or a combination thereof; (3) a software module configured to create or receive an electronic key; and (4) a software module configured to grant an access to a physical or virtual resource based on the one or more biometric features, or on the electronic key, or on geo-location data, or on a time, or on one or more event, or on resource locations, or on other contextual data, or on a combination thereof. In some embodiments, the obtaining the one or more biometric features is completed in a contact-free manner. In some embodiments, one or more biometric features comprise features derived from one or more biometric modalities of a fingerprint, a palm print, an iris, a retina, a face, a human cardiac rhythm, and a human voice. In some embodiments, granting the access comprises verifying an identity of the end user based on the one or more biometric features and subsequently unlocking the physical or virtual resource. In some embodiments, granting the access comprises a simultaneous or near-simultaneous execution of events, the events being selected from the following group: (a) verification or identification of the one or more biometric features of the end user; (b) measurement of proximity of a geo-location of the end user to a location of the physical or virtual resource; (c) reading of a device ID of the digital processing device; (d) entering of a unique passcode by the end user on the digital processing device; and (e) verification or identification of a signature derived from one or more additional biometric modalities of the end user. In some embodiments, contextual data about the location of the physical or virtual resource changes over time, requiring time-based or event-based updates containing this location data to be sent from the physical or virtual resource to the digital processing devices of the end users, such that any geo-location dependent permissions associated with the location data of the physical or virtual resource remain valid. In some embodiments, granting the access comprises requiring permission from one or more additional users. In some embodiments, granting the access comprises an asynchronous execution of events, the events being selected from the following group: (a) verification or identification of the one or more biometric features of the end user; (b) measurement of proximity of a geo-location of the end user to a location of the physical or virtual resource; (c) reading of a device ID of the digital processing device; (d) entering of a unique passcode by the end user on the digital processing device; and (e) verification or identification of a signature derived from one or more additional biometric modalities of the end user. In some embodiments, contextual data about the location of the physical or virtual resource changes over time, requiring time-based or event-based updates containing this location data to be sent from the physical or virtual resource to the digital processing devices of the end users, such that any geo-location dependent permissions associated with the location data of the physical or virtual resource remain valid. In some embodiments, granting the access comprises requiring permission from one or more additional users. In some embodiments, the asynchronous execution of the events is permitted based on a monitoring of the digital processing device between time periods of the events. In some embodiments, the asynchronous execution of the events is permitted based on user-inputted or contextual data. In some embodiments, granting the access is executed in a contact-free process, the process comprising verification or identification of the end user via an optical or audio signature of the end user's one or more biometric modalities. In some embodiments, the optical signature of the end user's biometric modality is derived from a feature set of a human palm, performed by capturing an image or a set of images of the end user's palm through following steps: (a) detecting a palm area using local classifiers; (b) extracting features from one or more regions of interest; and (c) computing a matching score against one or more user models stored in a database, the database is augmented dynamically through a learning process. In some embodiments, the learning process comprises a deep learning-based architecture. In some embodiments, the physical resource comprises one or more of: a house, an apartment, a hotel room, an office, a building, a facility, a storage unit, an automobile, a bicycle, a motorcycle, an airplane, a helicopter, a remotely operated robot such as a drone, or a maritime vessel. In some embodiments, the physical resource comprises a subspace of one or more of: a house, an apartment, a hotel room, an office, a building, a facility, a storage unit, an automobile, a bicycle, a motorcycle, an airplane, a helicopter, a remotely operated robot such as a drone, or a maritime vessel. In some embodiments, the virtual resource comprises one or more of: financial information, a digital services account, a digital goods account, an individual file, a plurality of files, a user interface, a security system, an operating system, an application, a plurality of applications, an email, or a telecommunications system. In some embodiments, the electronic key is revocable. In some embodiments, the electronic key is time-denominated, event-denominated, or a combination thereof. In some embodiments, the electronic key is synchronized with a database in a computing device. In some embodiments, the computing device is controlled by a manager of the physical or virtual resource, the manager allowing a user of the computing device to perform one or more of the following: (a) viewing data associated with the electronic key; (b) communicating directly with the end user; (c) creating or destroying the electronic key; and (d) sending or receiving the electronic key. In some embodiments, the data associated with the electronic key data is updated regularly or in real-time. In some embodiments, the application further comprises a software module configured to receive, store, transmit, or create the electronic key to the physical or virtual resource.

In various embodiments, the technology described herein is non-transitory computer-readable storage media encoded with a computer program including instructions executable by a digital signal processor to create an application for electronic key provisioning and access management, the application comprising: (a) a software module configured to obtain one or more biometric features of an end user; (b) a software module configured to receive geo-location data, other contextual data, or a combination thereof; (c) a software module configured to create or receive an electronic key; and (d) a software module configured to grant an access to a physical or virtual resource based on the one or more biometric features, or on the electronic key, or on geo-location data, or on a time, or on one or more event, or on resource locations, or on other contextual data, or on a combination thereof. In some embodiments, the obtaining the one or more biometric features is completed in a contact-free manner. In some embodiments, one or more biometric features comprise features derived from one or more biometric modalities of a fingerprint, a palm print, an iris, a retina, a face, a human cardiac rhythm, and a human voice. In some embodiments, granting the access comprises verifying an identity of the end user based on the one or more biometric features and subsequently unlocking the physical or virtual resource. In some embodiments, granting the access comprises a simultaneous or near-simultaneous execution of events, the events being selected from the following group: (a) verification or identification of the one or more biometric features of the end user; (b) measurement of proximity of a geo-location of the end user to a location of the physical or virtual resource; (c) reading of a device ID of the digital processing device; (d) entering of a unique passcode by the end user on the digital processing device; and (e) verification or identification of a signature derived from one or more additional biometric modalities of the end user. In some embodiments, contextual data about the location of the physical or virtual resource changes over time, requiring time-based or event-based updates containing this location data to be sent from the physical or virtual resource to the digital processing devices of the end users, such that any geo-location dependent permissions associated with the location data of the physical or virtual resource remain valid. In some embodiments, granting the access comprises requiring permission from one or more additional users. In some embodiments, granting the access comprises an asynchronous execution of events, the events being selected from the following group: (a) verification or identification of the one or more biometric features of the end user; (b) measurement of proximity of a geo-location of the end user to a location of the physical or virtual resource; (c) reading of a device ID of the digital processing device; (d) entering of a unique passcode by the end user on the digital processing device; and (e) verification or identification of a signature derived from one or more additional biometric modalities of the end user. In some embodiments, contextual data about the location of the physical or virtual resource changes over time, requiring time-based or event-based updates containing this location data to be sent from the physical or virtual resource to the digital processing devices of the end users, such that any geo-location dependent permissions associated with the location data of the physical or virtual resource remain valid. In some embodiments, granting the access comprises requiring permission from one or more additional users. In some embodiments, the asynchronous execution of the events is permitted based on a monitoring of the digital processing device between time periods of the events. In some embodiments, the asynchronous execution of the events is permitted based on user-inputted or contextual data. In some embodiments, granting the access is executed in a contact-free process, the process comprising verification or identification of the end user via an optical or audio signature of the end user's one or more biometric modalities. In some embodiments, the optical signature of the end user's biometric modality is derived from a feature set of a human palm, performed by capturing an image or a set of images of the end user's palm through following steps: (a) detecting a palm area using local classifiers; (b) extracting features from one or more regions of interest; and (c) computing a matching score against one or more user models stored in a database, the database is augmented dynamically through a learning process. In some embodiments, the learning process comprises a deep learning-based architecture. In some embodiments, the physical resource comprises one or more of: a house, an apartment, a hotel room, an office, a building, a facility, a storage unit, an automobile, a bicycle, a motorcycle, an airplane, a helicopter, a remotely operated robot such as a drone, or a maritime vessel. In some embodiments, the physical resource comprises a subspace of one or more of: a house, an apartment, a hotel room, an office, a building, a facility, a storage unit, an automobile, a bicycle, a motorcycle, an airplane, a helicopter, a remotely operated robot such as a drone, or a maritime vessel. In some embodiments, the virtual resource comprises one or more of: financial information, a digital services account, a digital goods account, an individual file, a plurality of files, a user interface, a security system, an operating system, an application, a plurality of applications, an email, or a telecommunications system. In some embodiments, the electronic key is revocable. In some embodiments, the electronic key is time-denominated, event-denominated, or a combination thereof. In some embodiments, the electronic key is synchronized with a database in a computing device. In some embodiments, the computing device is controlled by a manager of the physical or virtual resource, the manager allowing a user of the computing device to perform one or more of the following: (a) viewing data associated with the electronic key; (b) communicating directly with the end user; (c) creating or destroying the electronic key; and (d) sending or receiving the electronic key. In some embodiments, the data associated with the electronic key data is updated regularly or in real-time. In some embodiments, the application further comprises a software module configured to receive, store, transmit, or create the electronic key to the physical or virtual resource.

In various embodiments, the technology described herein is a method implemented by a computer for electronic key provisioning and access management, the method comprising: (a) obtaining, by the computer, one or more biometric features of an end user; (b) receiving, by the computer, geo-location data, other contextual data, or a combination thereof; (c) creating or receiving, by the computer, an electronic key; and (d) granting, by the computer, an access to a physical or virtual resource based on the one or more biometric features, or on the electronic key, or on geo-location data, or on a time, or on one or more event, or on resource locations, or on other contextual data, or on a combination thereof. In some embodiments, obtaining the one or more biometric features is completed in a contact-free manner. In some embodiments, the one or more biometric features comprise features derived from one or more biometric modalities of a fingerprint, a palm print, an iris, a retina, a face, a human cardiac rhythm, and a human voice. In some embodiments, granting the access comprises verifying an identity of the end user based on the one or more biometric features and subsequently unlocking the physical or virtual resource. In some embodiments, granting the access comprises a simultaneous or near-simultaneous execution of events, the events being selected from the following group: (a) verification or identification of the one or more biometric features of the end user; (b) measurement of proximity of a geo-location of the end user to a location of the physical or virtual resource; (c) reading of a device ID of the digital processing device; (d) entering of a unique passcode by the end user on the computer; and (e) verification or identification of a signature derived from one or more additional biometric modalities of the end user. In some embodiments, contextual data about the location of the physical or virtual resource changes over time, requiring time-based or event-based updates containing this location data to be sent from the physical or virtual resource to the digital processing devices of the end users, such that any geo-location dependent permissions associated with the location data of the physical or virtual resource remain valid. In some embodiments, granting the access comprises requiring permission from one or more additional users. In some embodiments, granting the access comprises an asynchronous execution of events, the events being selected from the following group: (a) verification or identification of the one or more biometric features of the end user; (b) measurement of proximity of a geo-location of the end user to a location of the physical or virtual resource; (c) reading of a device ID of the computer; (d) entering of a unique passcode by the end user on the computer; and (e) verification or identification of a signature derived from one or more additional biometric modalities of the end user. In some embodiments, contextual data about the location of the physical or virtual resource changes over time, requiring time-based or event-based updates containing this location data to be sent from the physical or virtual resource to the digital processing devices of the end users, such that any geo-location dependent permissions associated with the location data of the physical or virtual resource remain valid. In some embodiments, granting the access comprises requiring permission from one or more additional users. In some embodiments, the asynchronous execution of the events is permitted based on a monitoring of the computer between time periods of the events. The asynchronous execution of the events is permitted based on user-inputted or contextual data. In some embodiments, granting the access is executed in a contact-free process, the process comprising verification or identification of the end user via an optical or audio signature of the end user's one or more biometric modalities. In some embodiments, the optical signature of the end user's biometric modality is derived from a feature set of a human palm, performed by capturing an image or a set of images of the end user's palm through following steps: (a) detecting a palm area using local classifiers; (b) extracting features from one or more regions of interest; and (c) computing a matching score against one or more user models stored in a database, the database is augmented dynamically through a learning process. In some embodiments, the learning process comprises a deep learning-based architecture. In some embodiments, the physical resource comprises one or more of: a house, an apartment, a hotel room, an office, a building, a facility, a storage unit, an automobile, a bicycle, a motorcycle, an airplane, a helicopter, a remotely operated robot such as a drone, or a maritime vessel. In some embodiments, the physical resource comprises a subspace of one or more of: a house, an apartment, a hotel room, an office, a building, a facility, a storage unit, an automobile, a bicycle, a motorcycle, an airplane, a helicopter, a remotely operated robot such as a drone, or a maritime vessel. In some embodiments, the virtual resource comprises one or more of: financial information, a digital services account, a digital goods account, an individual file, a plurality of files, a user interface, a security system, an operating system, an application, a plurality of applications, an email, or a telecommunications system. In some embodiments, the electronic key is revocable. In some embodiments, the electronic key is time-denominated, event-denominated, or a combination thereof. In some embodiments, the electronic key is synchronized with a database in a computing device. In some embodiments, the computing device is controlled by a manager of the physical or virtual resource, the manager allowing a user of the computing device to perform one or more of the following: (a) viewing data associated with the electronic key; (b) communicating directly with the end user; (c) creating or destroying the electronic key; and (d) sending or receiving the electronic key. In some embodiments, the data associated with the electronic key data is updated regularly or in real-time. In some embodiments, the method further comprises receiving, storing, transmitting, or creating, by the computer, the electronic key to the physical or virtual resource.

Basic System

Referring to FIG. 1A, in one embodiment of the invention, a user 101 unlocks access to an electronic key stored on a mobile device 103 by authenticating his or her credentials via the mobile device. The authentication protocol includes verification or identification of the user via biometric matching of the user, for example using the mobile device camera to match the user based on a signature derived from a feature set extracted from the optical image or set of images of his or her palm print, as well as potentially in combination with other direct or contextual data 102, such as the user's geo-location, device ID, or a number of other data inputs providing contextual information.

In some embodiments, the biometric information and contextual data are sent through a network (104, 105) to the physical or virtual resource 106. In some applications, the network comprises a wireless network (e.g., based on Bluetooth, Wi-Fi, non-cellular, cellular, etc.) or wired network (e.g., ADSL, cable, etc.) 104, followed by a data network 105 (e.g., a private computer network, Internet, etc.). Alternatively, the networks 104 and 105 can be integrated into a single network.

Upon verification or identification of the user's identity together with permission for that user to be granted access to the electronic key, the user is then granted access to physical or virtual resource 106 by transmittal of the electronic key to a computer-equipped device with control to selectively lock or unlock physical or virtual access to the target resource.

In some cases, there is more than one end user. Referring again to FIG. 1A, another end user 109 utilizes his or her device 107 to access the physical or virtual resource 106. The users 101 and 109 may access the resource at the same time, at different times, at the same location, at different locations, or a combination thereof.

In various embodiments, the devices 103 and 107 comprise biometric sensors, or are coupled with biometric sensors. Biometric sensors are devices able to take images, videos, sounds, voices, or biological signals. Examples of biometric sensors include, but not limited to, cameras, camcorders, video recorders, voice recorders, and sound recorders.

System with Master User and Guest User

Figure 1B:
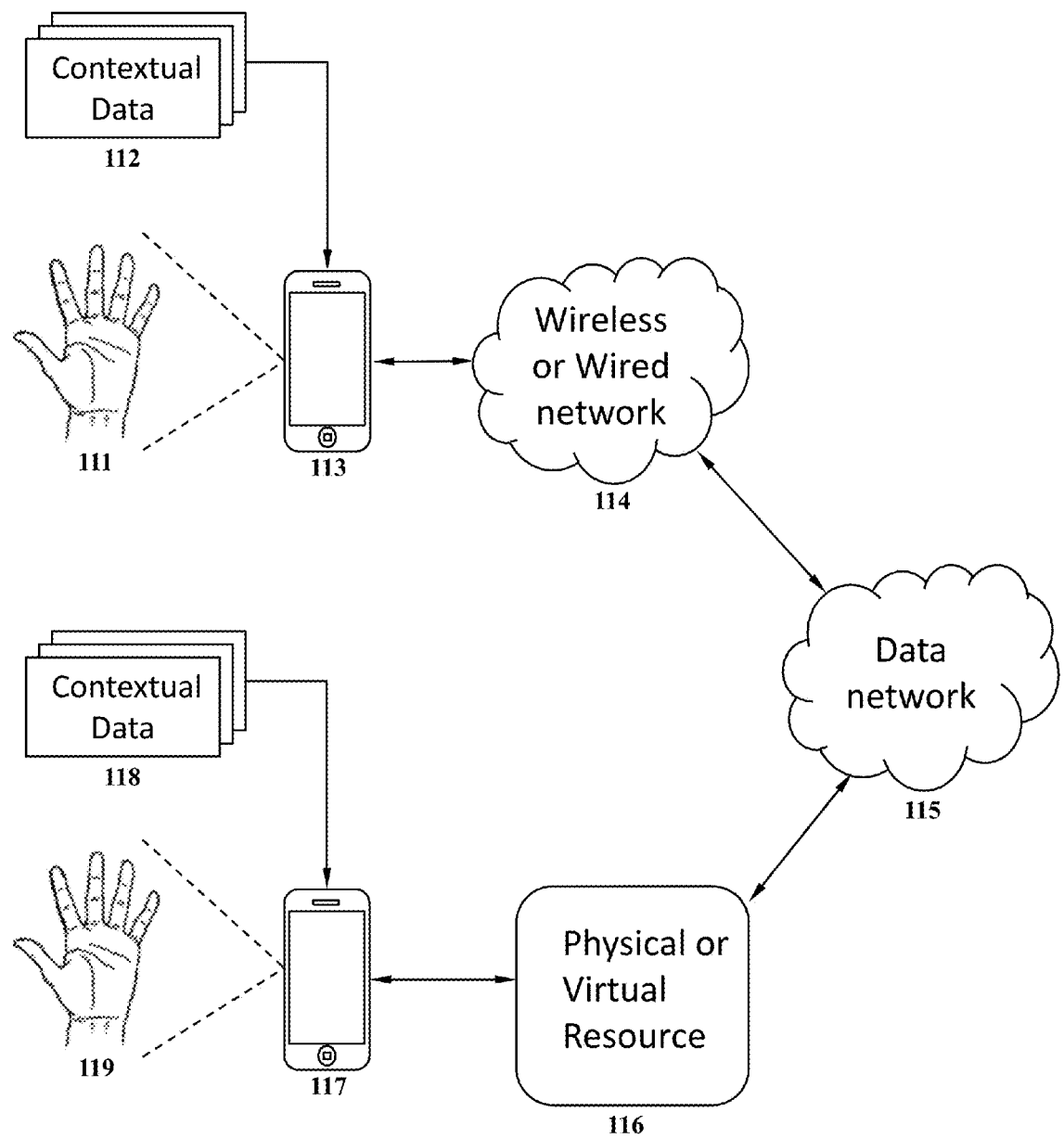
FIG. 1B shows an example system of electronic key provisioning and access management; in this case, master and guest users use the system.

Referring to FIG. 1B, in some embodiments, a user ("Master User", or user 119) provisions the electronic key granting access to physical or virtual resource 116 to another user ("Guest User", or user 111) in advance of the time and date of the Guest User's permission to access and/or utilize the asset or resource. In some designs, this provisioning process includes authentication of the Master User's identity via biometric matching and/or matching of contextual data 118 as a condition to unlocking his or her provisioning permissions, authentication of the Guest User's identity via biometric matching and/or matching of contextual data 112 as a condition to unlocking his or her access permissions, or some combination of permissioning of the Master User and the Guest User together, which may be achieved by using the mobile devices available to the Master User and the Guest User. In a preferred embodiment, the biometric matching is performed using the camera of the mobile devices to approve the users' identities based on the signatures derived from a feature set extracted from the optical image or set of images of the users' palm prints, as well as potentially in combination with other direct or contextual information about the users, such as the users' device IDs, geo-locations, or a number of other data inputs providing contextual information. This may be especially important if, for example, the Guest User does not have a mobile device able to perform the required authentication process at the date and time of provisioned access to the asset or resource. Further security measures including monitoring of the Guest User's mobile device carrying permission to use the electronic key, from the time of authentication of the user and continuing through to the date and time the electronic key is used for permitted access to the specified asset or resource, may be implemented to reduce risk that the Guest User is a different person than the individual intended to receive access to the asset or resource.

A key aspect of the technology is that the electronic key is thus programmable in novel ways. Importantly, the electronic key can be revocable, time-denominated, and/or event-denominated. In the case of the key being revocable, if the Master User decides for any reason, whether due to perceived risk of the Guest User's utilization of the asset or resource, whether due to any violation by the Guest User of certain agreements between the Guest User and the Master User, or for any other reason, the Master User can disable and render null the electronic key immediately, for example by changing the authentication key required for access, among other methods, such that the Guest User immediately loses access to said asset or resource.

In the case of the programmable electronic key being time-denominated, the Master User can configure the Guest User's access to be valid only on certain dates and within certain time windows, which may be either on a one-time basis, or a recurring basis, for example, weekly or monthly access to the asset or resource. In the case of the programmable electronic key being event-denominated, the Master User can configure the Guest User's access to be valid only upon the event or combined events of certain data-driven conditions being satisfied, which conditions may be independent of the timing of said event or events, or which conditions may be coupled with a further condition that said event or events take place within a pre-defined time window or series of time windows. For example, the granting of access to the Guest User can comprise a simultaneous or near-simultaneous verification or identification of the Guest User via his or her biometric signature, together with additional factors including: (a) the proximity of the geo-location of the Guest User to the location of the resource for which access by the Guest User is desired as measured by the Guest User's mobile device, for example; (b) the device ID of the Guest User's mobile device; (c) a unique passcode entered by the Guest User on said mobile device; (d) the signature derived from one or more additional biometric modalities of the Guest User; or (e) any combination thereof.

In some embodiments, contextual data about the location of the physical or virtual resource changes over time, requiring time-based or event-based updates containing this location data to be sent from the physical or virtual resource to the digital processing devices of the end users, such that any geo-location dependent permissions associated with the location data of the physical or virtual resource remain valid.

Thusly, a key aspect of the invention is that resource access can now be programmatically provisioned in a way that was either not possible or practical in the prior art, enabling the asset or resource to be provisioned to one or multi-users as a pay-per-use on-demand service, instead of an underwritten obligation with less elasticity of use, lower asset utilization due to being reserved for exclusive use even when the Guest User is not using it, and generally higher financial cost of use due to these inefficiencies.

Contextual Data

Referring to FIG. 1A and FIG. 1B, in some embodiments, the system transmits contextual data for electronic key provisioning. Contextual data comprises data or information associated with a condition where a user is using the system.

In various implementations, contextual data comprises geo-location data of an end user, e.g., a house number, a unit number, a building, a center, a bank, a fitness center, an enterprise, a firm, a company, a hotel, a clinic, a medical center, a hospital, a school, a university, a government agency, a library, a station, a road crossing, a landmark, an attraction, a hotel, a theater, a street, a county, a city, a geographic region, a country, a continent, an aerospace, etc.

In some applications, contextual data comprises device information, e.g., an IP address, browser, a user ID, a timestamp, an operating system, a device type, a device manufacturer, network connectivity, a network carrier, a network type, etc.

An example of contextual data includes vehicles a user is taking, e.g., a public transportation system, a personal automobile, a motorcycle, a taxi, a car, a bicycle, a bus, a train, a tram, a boat, a ship, an airplane, shuttle, etc.

Another example includes activities that a user is doing or participating, e.g., a breakfast, a lunch, a dinner, a wedding, a meeting, a conference, a travel, a ceremony, a celebration, a training, a class, an interview, a chat, a phone call, a document preparation, cooking, bathing, showering, sleeping, reading, singing, working, walking, driving, music playing, sports playing, taking a break, seeing, movie-watching, etc.

A person with skills in the art can easily recognize potential variations of contextual data.

Key Components of the System

Figure 2:
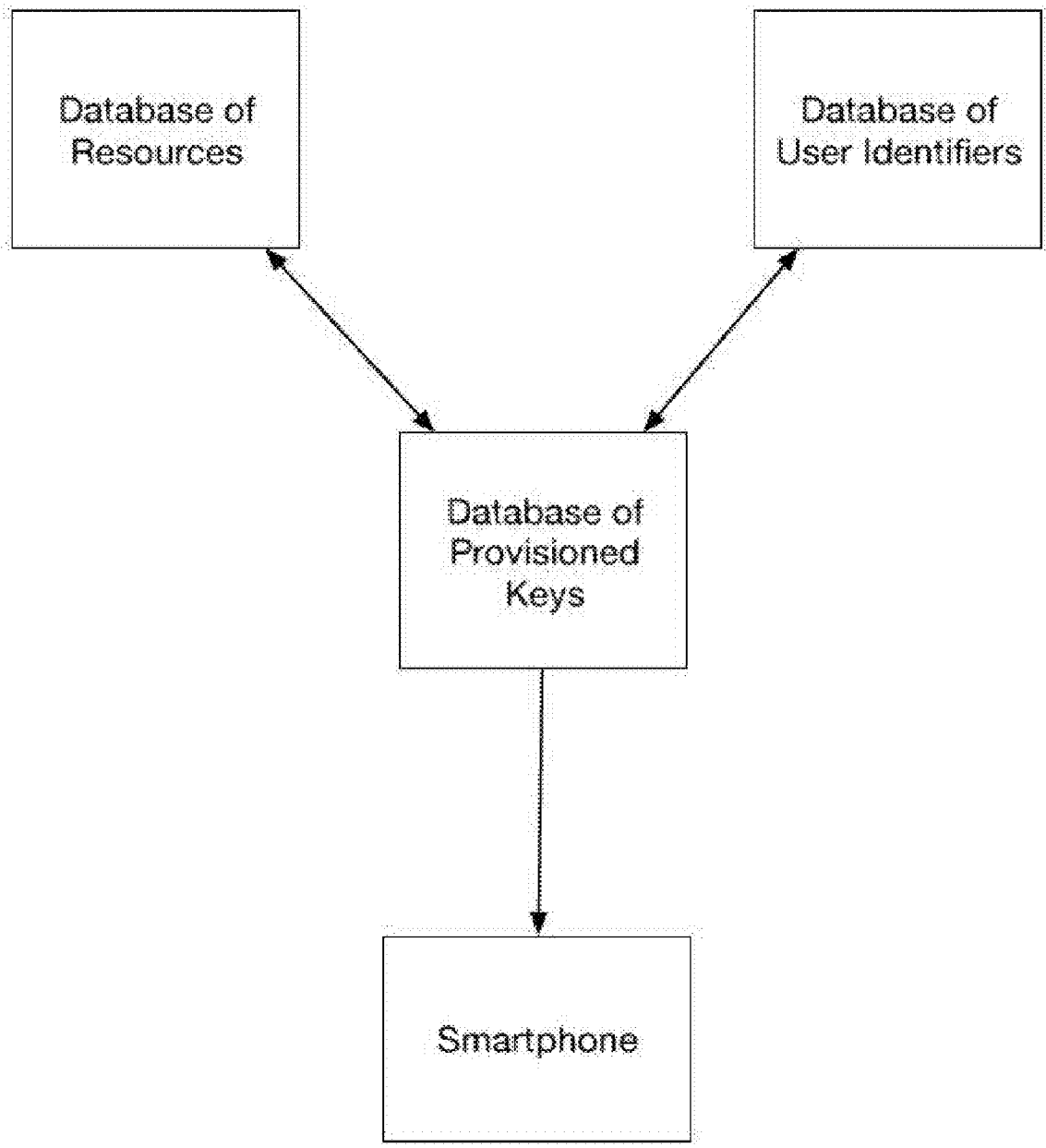
FIG. 2 shows an example diagram depicting the major components of the key provisioning system.

With reference to FIG. 2, a discussion of the key components of the system of the present invention now follows as well as the context in which each of these components interact with one another to derive the advantages of the present invention. All of the databases can be located on the same computing device or can be located remotely from each other. When a user is entered into the system, his or her character string-based identifier (e.g., email address, phone number, or both) will be stored in the Database of User Identifiers. The manager of the system will be able to create a relationship between the user and a resource. In some embodiments, the resources are stored in the Database of Resources. The manager is able to associate a start time and a duration for approved access. This relationship is stored in the Database of Provisioned Keys. Upon completion or invalidation of the approved access period, the key is marked as invalid and the database will prevent the key from being modified or used. When a smartphone requests keys for a specific user, the database will only send valid keys, ones that have not expired and/or been marked invalid.

In the case that the manager decides to delete a resource from the database, the resource may remain in the database and the provisioned keys associated to the resource may also remain, but they may become invalid.

If it is instead a user that is deleted, the user may be marked as terminated and the keys associated with that user may be marked invalid.

System Flow Chart

Figure 3:
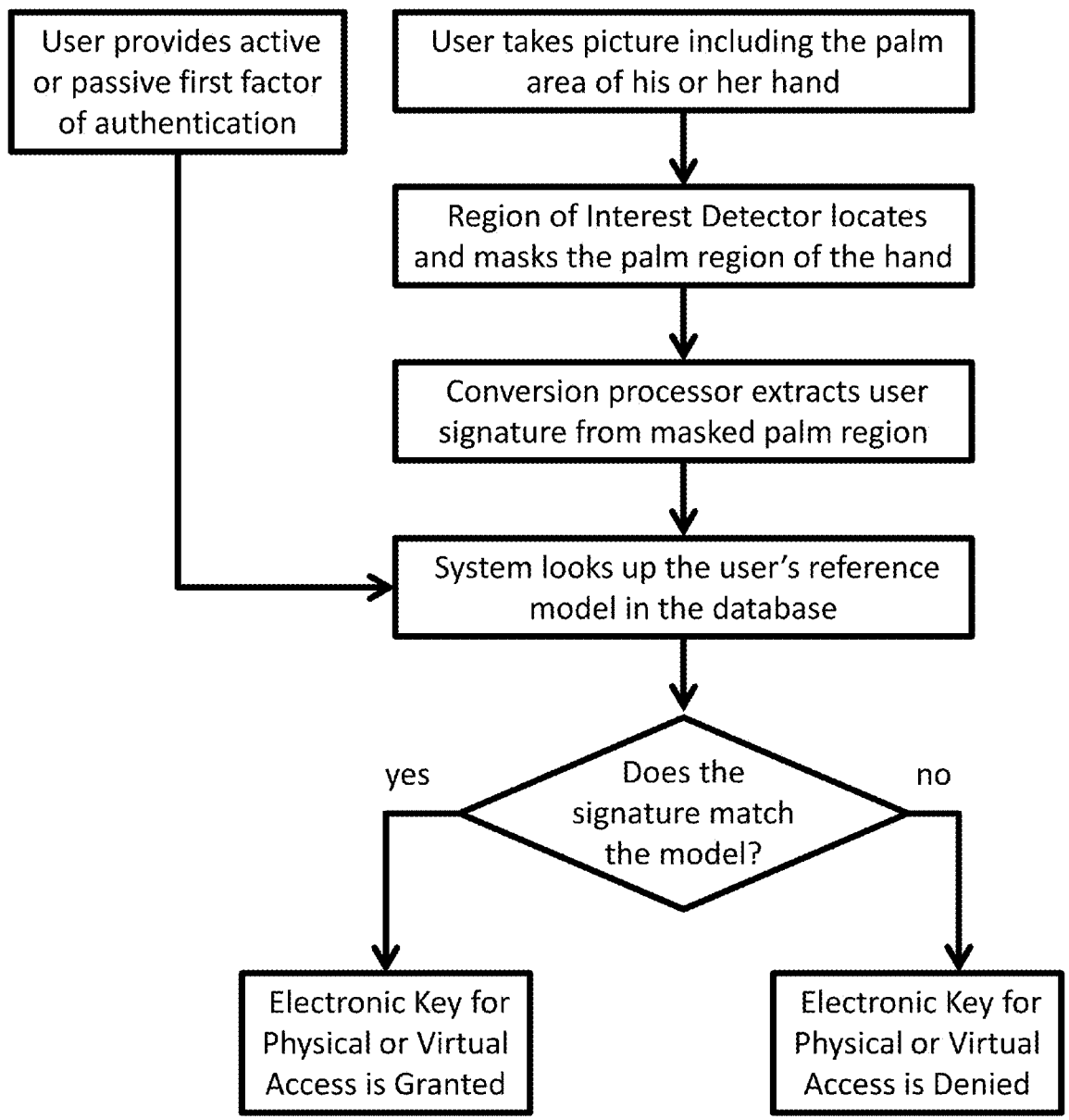
FIG. 3 shows an example flowchart illustrating key steps in authenticating a user or device according to the present invention in a preferred embodiment thereof.

Turning now to FIG. 3, the methodology of user/device authentication and/or identification according to a preferred embodiment of the present invention is now described. By way of initial discussion, the difference between authentication and identification in the context of the teachings of the present invention is first described.

In the case of authentication, the user may present a first factor of authentication for his or her identity actively in the form of a user ID, for example, or passively in the form of his or her smartphone device ID, for example, and the system of the present invention verifies that the user is indeed who he or she claims to be by comparing the user's biometric signature to the identity provided by the first factor of authentication. For example, the system may compare the signature derived from an image or set of images of the user's palm with the corresponding model in the database of user models. If they match, the user is authenticated. If they do not match, the user is rejected.

The flowchart for user authentication according to the teachings of the present technology, in a preferred embodiment, is shown in FIG. 3. In some embodiments, the user begins with opening the application on his or her smartphone. At this time, the application may download all keys that have been provisioned since the application was previously opened. Once the application has completed the downloading of the new keys, the application may display the keys. At this point, the user may be able to select a key and view details of the key. The details of the key may include the time duration of the key, details about the resource to which the key corresponds to, the individual or entity who provisioned the key, and the individual to whom the key was provisioned. Next, the user may authenticate via his or her biometrics, for example by taking a picture or a set of pictures of the palm of his or her hand or hands using the camera of the smartphone. Next, the Camera Data Processor sends the raw pixel data to the Region of Interest Detector, which determines the palm area within the image. The masked palm area from the Region of Interest Detector is fed to the Conversion Processor, which derives the unique signature of the user. This conversion function can alternatively be processed on a remote resource or partially on a remote resource and partially on the smartphone. With no direct contact between the imaged palm area and the smartphone, using high-resolution images of the hand, taken free-form and in any orientation by the end user without any special hardware beyond a common digital camera, the system of the present invention identifies the individual using a multi-step software solution involving feature extraction, feature processing into user signatures, and the matching of user signatures to stored user signatures or user models in which (i) a single or multiple region of interest are detected and segmented from the input image to remove extraneous pixel data and isolate the palm area; (ii) a number of high dimensional sparse feature vectors are extracted from the image; (iii) a single signature for each image is created in a process in which nearby feature vectors are pooled into a more compact and robust image representation; and (iv) multiple image signatures are combined into an identity model for each individual user.

The Authentication and Identification Engine then looks up the user's model in the Database of User Models. At this point, if the derived user signature matches the stored user model, then the user is authenticated and is permitted access to the desired resources or set of resources. Alternatively, if the user signature and model do not match, then the user is denied access to the desired resource or set of resources. The foregoing functionality regarding looking up and matching may alternatively be performed remotely to the smartphone.

Figure 4:
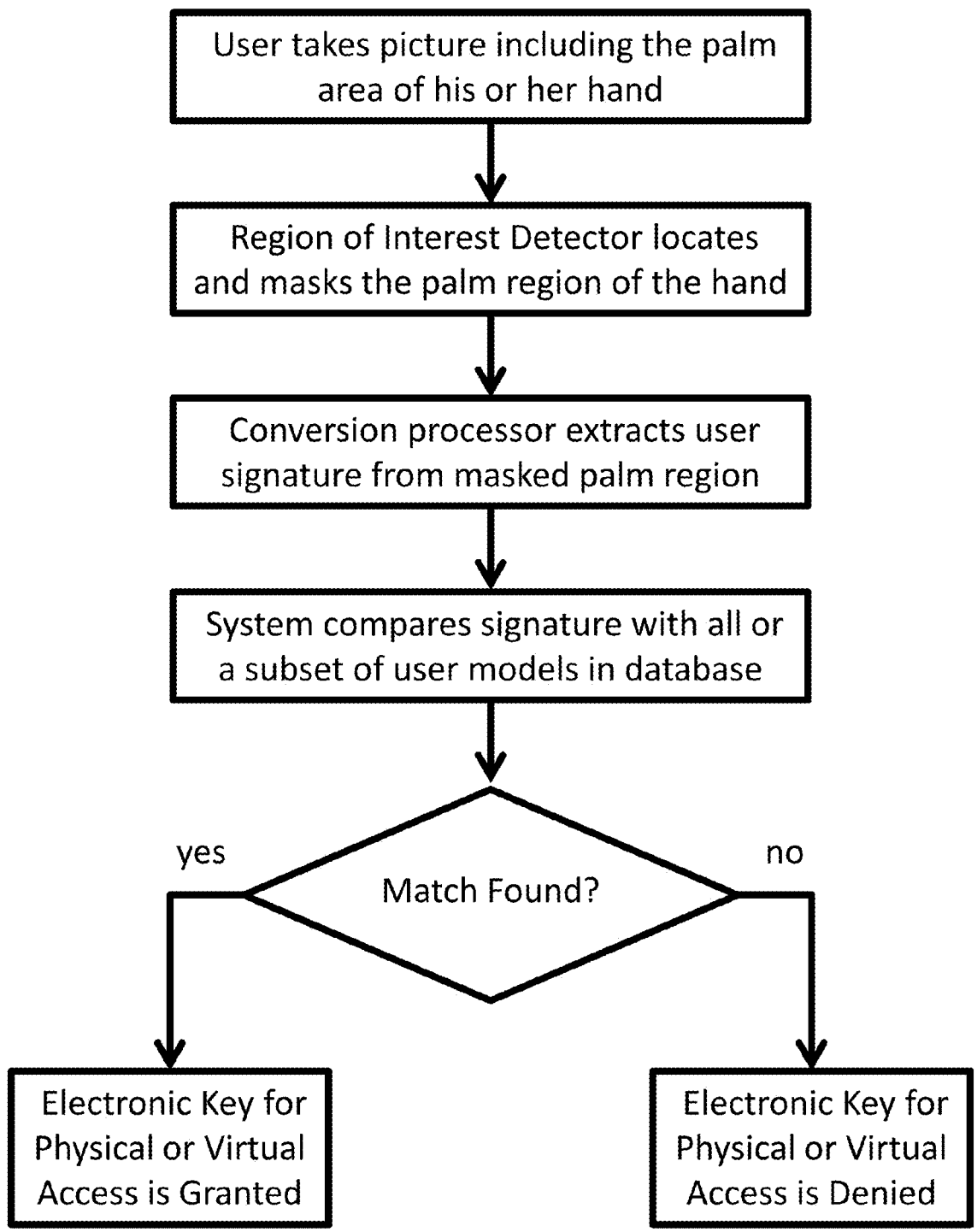
FIG. 4 shows an example flowchart illustrating key steps in identifying a user or device according to the present invention in a preferred embodiment thereof.

The flowchart for user identification is shown in FIG. 4. In this case, the user may start by taking a picture or a set of pictures of the palm of his or her hand. This data is again processed into pixel form by the Camera Data Processor and sent to the Region of Interest Detector to determine the palm area within the image. The masked palm area from the Region of Interest Detector is fed to the Conversion Processor which derives the unique signature of the user and then the Authentication and Identification Engine compares the derived signatures with all models or a subset of models stored in the Database of User Models. The above referenced conversion and comparison functions could alternatively be processed on a remote resource or partially on a remote resource and on the smartphone. In any event, if a match is found, then the user is identified and may be granted access to a resource or set of resources. If no match is found, then the user cannot be identified and access to a desired resource will not be granted.

Whether in the case of authentication or identification, when a smartphone connects with the server to check for new keys, it may also check the status of previously downloaded keys and may confirm that no changes have been made to the key. In the case that changes have been made to the key, the previous key may be deleted. If the key becomes deleted, the smartphone may request a new copy of the key from the server. If the key has not been invalidated, the database may send a new copy of the key to the smartphone for the purpose of permitting access to desired resources.

Which mode (authentication or identification) is used depends on the application. In general, authentication provides a higher degree of accuracy but a lower user experience level because of the extra step a user needs to take to enter an additional factor of his or her identity. The second factor of identity can take any of the common forms, such as a user name, user ID, password, unique employee ID, social security number, email address, a variety of other biometric modalities, among others. In one embodiment of the present invention, the second factor of identity is the signature derived from the palm print image(s) of the individual's second hand, with individual signatures of each of both palm print images or sets of images of the individual utilized together for authentication or identification.

Figure 5:
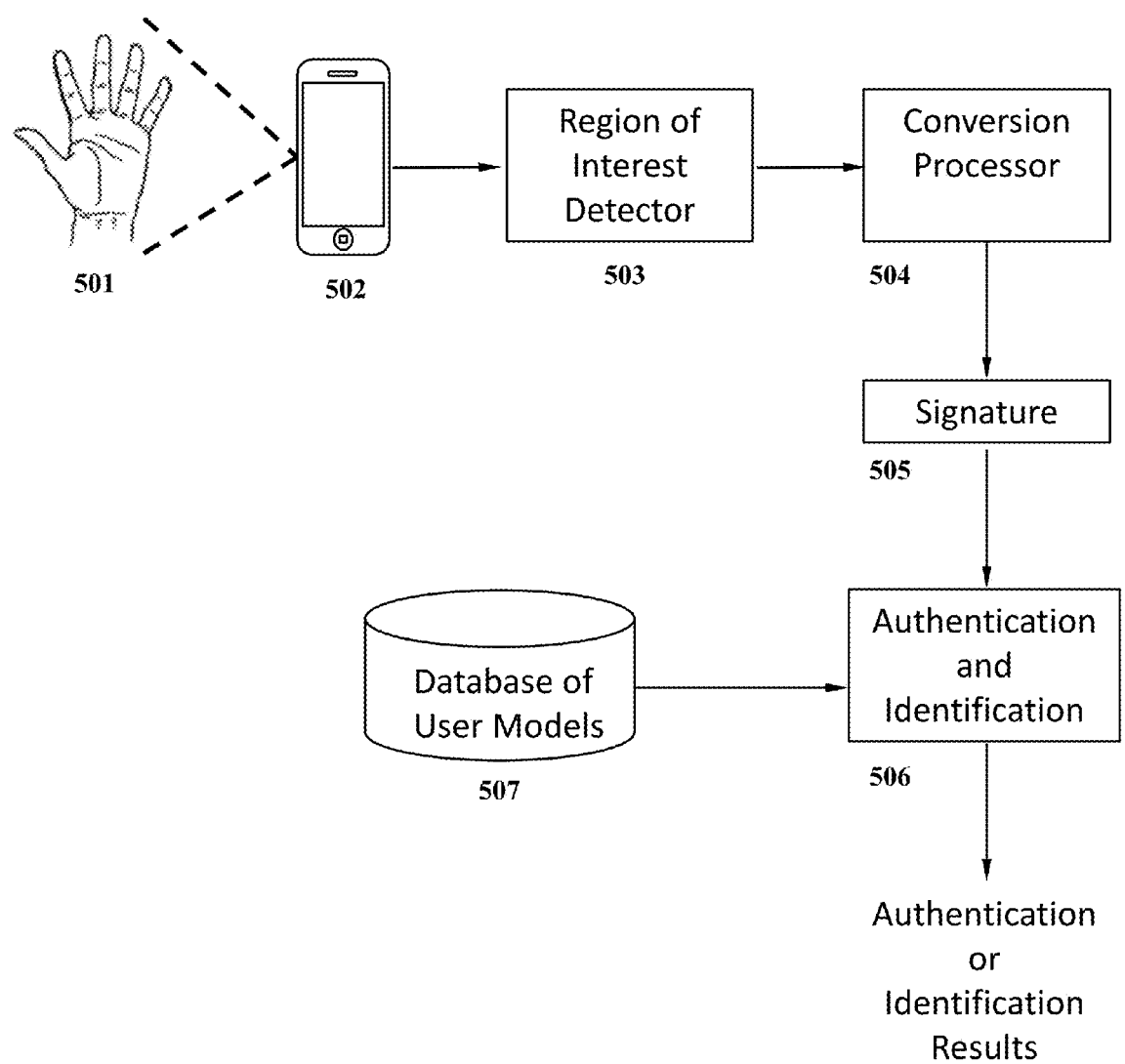
FIG. 5 shows an example system of biometric authentication.

FIG. 5 illustrates an example system. A user uses a mobile phone 502 to take one or more images of his or her palm 501. The mobile phone further automatically identifies region of interest 503 of the palm area. Region of interest 503 is sent to a conversion processor 504 to extract biometric features and create a signature 505. To access a physical or virtual resource, a module of authentication and identification 506 takes the signature and compares it with a database of user models 507. The comparison generates authentication or identification results which are utilized in granting or declining the access to the resource.

Applications of the System

Based on the above description of the system and methodologies of the present invention, it can be understood that various applications are possible. Examples include, without limitation, provisioning and providing temporary access to a living space belonging to another person, provisioning and providing access to one's own living space, provisioning and providing access to a hotel room or hotel facilities, provisioning and providing access to an automobile, whether one's own automobile or one belonging to another person or business entity, activating said automobile for driving and other operations, provisioning and providing access to other equipment such as a thermostat, refrigerator, washer/dryer, HVAC, security monitoring system for a home or business environment, provisioning and providing access to a virtual data room, provisioning and providing access to a digital financial account, or a variety of other physical and virtual resources.

Digital Processing Device

In some embodiments, the system, media, and method described herein include a digital processing device, or use of the same. In further embodiments, the digital processing device includes one or more hardware central processing units (CPU) that carry out the device's functions. In still further embodiments, the digital processing device further comprises an operating system configured to perform executable instructions. In some embodiments, the digital processing device is optionally connected to a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory module. The storage and/or memory module is one or more physical apparatuses used to store data or programs on a temporary or permanent basis. In some embodiments, the module is volatile memory and requires power to maintain stored information. In some embodiments, the module is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory module is a combination of modules such as those disclosed herein.

In some embodiments, the digital processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera to capture motion or visual input. In still further embodiments, the input device is a combination of devices such as those disclosed herein.

Non-Transitory Computer Readable Storage Medium

In some embodiments, the system, media, and method disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the system, media, and method disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Web Browser Plug-in

In some embodiments, the computer program includes a web browser plug-in. In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called microbrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Software Modules

In some embodiments, the system, media, and method disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the system, media, and method disclosed herein include one or more databases, or use of the same. In view of the disclosure provided herein, those of skill in the art will recognize that many databases are suitable for storage and retrieval of biometric information. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

What is claimed is:

1. A computer-implemented system for electronic key provisioning, user authentication, and access management, the system comprising:
   (a) a digital processing device comprising a memory module and an operating system configured to perform executable instructions;
   (b) a computer program including instructions processed by the digital processing device to execute an application comprising:
      (i) a first software module configured to obtain one or more biometric features of an end user in a contact-free process, wherein the one or more biometric features are derived from one or more of the following biometric modalities: a fingerprint, a palm print, an iris, a retina, a face, a human cardiac rhythm, and a human voice;
      (ii) a second software module configured to authenticate the end user based on the biometric features and create or receive an electronic key in response to the authentication, wherein the electronic key is revocable based on a time-denomination, a geo-location-denomination, and an event-denomination, wherein the time denomination comprises one or more time windows, and wherein the geo-location-denomination comprises a proximity of the geo-location of an end user to a location of a physical or virtual resource; and
      (iii) a third software module configured to grant an access to the physical or virtual resource based on the one or more biometric features and the electronic key, wherein the granting the access is based on the event or the one or more time windows, and the proximity of the geo-location of the end user to the location of the physical or virtual resource.

2. The system of claim 1, wherein the granting the access comprises verifying an identity of the end user based on the one or more biometric features and subsequently unlocking the physical or virtual resource.

3. The system of claim 1, wherein the granting the access comprises (a) a simultaneous or near-simultaneous execution of events, or (b) an asynchronous execution of the events, the events being selected from the following group: (1) verification or identification of the one or more biometric features of the end user; (2) reading of a device ID of the digital processing device; (3) entering of a unique passcode by the end user on the digital processing device; (4) verification or identification of a signature derived from one or more additional biometric modalities of the end user; and (5) analysis of contextual data to match a user status of the end user.

4. The system of claim 3, wherein the contextual data and data of the location of the physical or virtual resource is updated and sent to the digital processing device on a time-based or event-based schedule, such that any changes in geo-location dependent permissions associated with the data of the location of the physical or virtual resource can be compared against the geo-location of the end user for determination of the granting the access.

5. The system of claim 3, wherein the granting the access comprises requiring permission from one or more additional users.

6. The system of claim 3, wherein the asynchronous execution of the events is permitted based on (a) a monitoring of the digital processing device between time periods of the events, or (b) user-inputted or contextual data.

7. The system of claim 1, wherein the contact-free process comprises verification or identification of the end user via an optical or audio signature of the end user's one or more biometric modalities.

8. The system of claim 7, wherein the optical signature of the end user's biometric modality is derived from a feature set of a human palm, performed by capturing an image or a set of images of the end user's palm through following steps: (a) detecting a palm area using local classifiers; (b) extracting features from one or more regions of interest; and (c) computing a matching score against one or more user models stored in a database, provided that the database is augmented dynamically through a learning process and the learning process comprises a deep learning-based methodology.

9. The system of claim 1, wherein the physical resource comprises (a) one or more of: a house, an apartment, a hotel room, an office, a building, a facility, a storage unit, an automobile, a bicycle, a motorcycle, an airplane, a helicopter, a remotely operated robot such as a drone, or a maritime vessel; or (b) a subspace of one or more of: a house, an apartment, a hotel room, an office, a building, a facility, a storage unit, an automobile, a bicycle, a motorcycle, an airplane, a helicopter, a remotely operated robot such as a drone, or a maritime vessel.

10. The system of claim 1, wherein the virtual resource comprises one or more of: financial information, a digital services account, a digital goods account, an individual file, a plurality of files, a user interface, a security system, an operating system, an application, a plurality of applications, an email, or a telecommunications system.

11. The system of claim 1, wherein the electronic key is synchronized with a database in a computing device, the computing device being controlled by a manager of the physical or virtual resource and the manager allowing a user of the computing device to perform one or more of the following:
    (a) viewing data associated with the electronic key;
    (b) communicating directly with the end user;
    (c) creating or destroying the electronic key; and
    (d) sending or receiving the electronic key.

12. The system of claim 1, wherein the application further comprises a fourth software module configured to receive, store, transmit, or create the electronic key to the physical or virtual resource.

13. Non-transitory computer-readable storage media encoded with a computer program including instructions executable by a digital signal processor to create an application for electronic key provisioning, authentication, and access management, the application comprising:
    (a) a first software module configured to obtain one or more biometric features of an end user in a contact-free process, wherein the one or more biometric features are derived from one or more of the following biometric modalities: a fingerprint, a palm print, an iris, a retina, a face, a human cardiac rhythm, and a human voice;
    (b) a second software module configured to authenticate the end user based on the biometric features and create or receive an electronic key in response to the authentication, wherein the electronic key is revocable based on a time-denomination, a geo-location-denomination, and an event-denomination, wherein the time denomination comprises one or more time windows, and wherein the geo-location-denomination comprises a proximity of the geo-location of an end user to a location of a physical or virtual resource; and
    (c) a third software module configured to grant an access to the physical or virtual resource based on the one or more biometric features and the electronic key, wherein the granting the access is based on the event or the one or more time windows, and the proximity of the geo-location of the end user to the location of the physical or virtual resource.

14. The media of claim 13, wherein the granting the access comprises verifying an identity of the end user based on the one or more biometric features and subsequently unlocking the physical or virtual resource.

15. The media of claim 13, wherein the granting the access comprises (a) a simultaneous or near-simultaneous execution of events, or (b) an asynchronous execution of the events, the events being selected from the following group: (1) verification or identification of the one or more biometric features of the end user; (2) reading of a device ID of the digital processing device; (3) entering of a unique passcode by the end user on the digital processing device; (4) verification or identification of a signature derived from one or more additional biometric modalities of the end user; and (5) analysis of contextual data to match a user status of the end user.

16. The media of claim 15, wherein the contextual data and data of the location of the physical or virtual resource is updated and sent to the digital processing device on a time-based or event-based schedule, such that any changes in geo-location dependent permissions associated with the data of the location of the physical or virtual resource can be compared against the geo-location of the end user for determination of the granting the access.

17. The media of claim 15, wherein the granting the access comprises requiring permission from one or more additional users.

18. The media of claim 15, wherein the asynchronous execution of the events is permitted based on (a) a monitoring of the digital processing device between time periods of the events, or (b) user-inputted or contextual data.

19. The media of claim 13, wherein the contact-free process comprises verification or identification of the end user via an optical or audio signature of the end user's one or more biometric modalities.

20. The media of claim 19, wherein the optical signature of the end user's biometric modality is derived from a feature set of a human palm, performed by capturing an image or a set of images of the end user's palm through following steps: (a) detecting a palm area using local classifiers; (b) extracting features from one or more regions of interest; and (c) computing a matching score against one or more user models stored in a database, provided that the database is augmented dynamically through a learning process and the learning process comprises a deep learning-based methodology.

21. The media of claim 13, wherein the physical resource comprises (a) one or more of: a house, an apartment, a hotel room, an office, a building, a facility, a storage unit, an automobile, a bicycle, a motorcycle, an airplane, a helicopter, a remotely operated robot such as a drone, or a maritime vessel; or (b) a subspace of one or more of: a house, an apartment, a hotel room, an office, a building, a facility, a storage unit, an automobile, a bicycle, a motorcycle, an airplane, a helicopter, a remotely operated robot such as a drone, or a maritime vessel.

22. The media of claim 13, wherein the virtual resource comprises one or more of: financial information, a digital services account, a digital goods account, an individual file, a plurality of files, a user interface, a security system, an operating system, an application, a plurality of applications, an email, or a telecommunications system.

23. The media of claim 13, wherein the electronic key is synchronized with a database in a computing device, the computing device being controlled by a manager of the physical or virtual resource and the manager allowing a user of the computing device to perform one or more of the following:
    (a) viewing data associated with the electronic key;
    (b) communicating directly with the end user;
    (c) creating or destroying the electronic key; and
    (d) sending or receiving the electronic key.

* * * * *